United States Patent
Yamaguchi

(10) Patent No.: US 6,424,753 B1
(45) Date of Patent: Jul. 23, 2002

(54) PIXEL INTERPOLATION METHOD AND CIRCUIT THEREFOR

(75) Inventor: Yuichiro Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/236,902

(22) Filed: Jan. 26, 1999

(30) Foreign Application Priority Data

Jan. 28, 1998 (JP) .......................... 10-014710

(51) Int. Cl.$^7$ ................................. G06K 9/32
(52) U.S. Cl. ....................... 382/300; 382/162
(58) Field of Search ................. 382/162, 163, 382/164, 165, 166, 167, 168, 169, 170, 171, 172, 299, 300, 278, 279, 293, 294, 295, 291, 292

(56) References Cited

U.S. PATENT DOCUMENTS

| | | | |
|---|---|---|---|
| 4,945,406 A | * 7/1990 | Cok | 358/80 |
| 5,038,216 A | * 8/1991 | Easterly et al. | 358/228 |
| 5,054,100 A | * 10/1991 | Tai | 382/47 |
| 5,382,976 A | * 1/1995 | Hibbard | 348/273 |
| 5,552,825 A | * 9/1996 | Talluri et al. | 348/22 |
| 5,832,143 A | * 11/1998 | Suga et al. | 382/300 |
| 5,847,714 A | * 12/1998 | Naqvi et al. | 345/439 |
| 5,930,407 A | * 7/1999 | Jensen | 382/300 |
| 5,982,984 A | * 11/1999 | Inuiya | 386/121 |

FOREIGN PATENT DOCUMENTS

| | | |
|---|---|---|
| JP | 4-277977 | 10/1992 |
| JP | 8-172636 | 7/1996 |
| JP | 9-182090 | 7/1997 |

* cited by examiner

*Primary Examiner*—Leo Boudreau
*Assistant Examiner*—Amir Alavi
(74) *Attorney, Agent, or Firm*—Young & Thompson

(57) ABSTRACT

A process of a pixel interpolation circuit is optimized for down-sizing of a circuit scale and improvement of process speed. The pixel interpolation method takes a pixel at a center of three row×three column image data as a target pixel subjecting interpolation process, and calculates color data of the target pixel and color data of pixels around the target pixel and adjacent thereto for outputting an interpolated color data for the target pixel. The pixel interpolation method includes a reading step of reading out image data of sequential first to third rows among image data of N rows×M columns written in a memory, per each column, wherein N and M are integer greater than and equal to three, and a color data determining step of determining the interpolated color data for the target pixel on the basis of a first color data as one of color data for three pixels of the column read out immediately before color data of the target pixel, second and third color data for two other pixels simultaneously read out with the target pixel, and a fourth color data as one of color data for three pixels of the columnw read out immediately after color data of the target pixel data.

19 Claims, 12 Drawing Sheets

FIG.2A

| B | G | B |
|---|---|---|
| G | R | G |
| B | G | B |

FIG.2B

| G | B | G |
|---|---|---|
| R | G | R |
| G | B | G |

FIG.2C

| G | R | G |
|---|---|---|
| B | G | B |
| G | R | G |

FIG.2D

| R | G | R |
|---|---|---|
| G | B | G |
| R | G | R |

EXAMPLE OF ORDER OF READING OUT

FIRST   R00
SECOND  G00, B10, G20
THIRD   R21

EXAMPLE OF ORDER OF READING OUT

FIRST   R00
SECOND  G00, B10, G20, R21

FIG.11

| KIND OF TARGET PIXEL | | X | OUTPUT SIDE REGISTER | | | | | | |
|---|---|---|---|---|---|---|---|---|---|
| | | | a | b | c | d | e | f | g |
| RG LINE | R | 0 | q/b | p | — | r/e | — | f | g |
| | R | 1 | p/b | q | — | s/e | — | t | t |
| | G | 0 | — | p | r/d | r | s | u | u |
| | G | 1 | — | q | s/d | s | r | t/g | — |
| GB LINE | G | 0 | — | p | s/d | r | r | u/g | — |
| | G | 1 | — | q | r/d | s | s | t/g | — |
| | B | 0 | p/b | p | — | r/e | — | t | u |
| | B | 1 | q/b | q | — | s/e | — | u | t |

FIG.12

| | SECOND LEAST SIGNIFICANT BIT OF v | p | q | r | s | t | u | WRITING |
|---|---|---|---|---|---|---|---|---|
| 0 | 00 | RAM_7 | RAM_8 | RAM_1 | RAM_2 | RAM_3 | RAM_4 | RAM_5,6 |
| 1 | 01 | RAM_1 | RAM_2 | RAM_3 | RAM_4 | RAM_5 | RAM_6 | RAM_7,8 |
| 2 | 10 | RAM_3 | RAM_4 | RAM_5 | RAM_6 | RAM_7 | RAM_8 | RAM_1,2 |
| 3 | 11 | RAM_5 | RAM_6 | RAM_7 | RAM_8 | RAM_1 | RAM_2 | RAM_3,4 |

TARGET PIXEL
(R0,G0,B0)

$R0 = (R1+R2+R3+R4)/4$ $G0 = (G1+G2+G3+G4)/4$ $B0 = B1$

PIXEL INTERPOLATION METHOD AND CIRCUIT THEREFOR

BACKGROUND OF THE INVENTION

1. Field of the Invention

The present invention relates to a pixel interpolation method and a pixel interpolation circuit for performing an interpolation process between pixels. More particularly, the invention relates to a pixel interpolation method and a pixel interpolation circuit performing interpolation between pixels for a signal output from a CCD (Charge Coupled Device) image pick-up device employing a primary color filter.

2. Description of the Related Art

A CCD employing a primary color filter has been used for an image pick-up device, particularly for a digital camera, a digital vide camera. In general, a digital data obtained by an A/D conversion of an analog signal output from the CCD is called as a row data. In case of the CCD with the primary color filter, the row data corresponding to each pixel in one-to-one basis only contains any one of R (Red; hereinafter represented by "R"), G (Green: hereinafter represented by "G") and B (hereinafter represented by "B") depending upon an array of a primary color filter arranged on a CCD photosensing surface per pixel.

A pixel interpolation circuit performs a pixel interpolation process for increasing resolution. In the pixel interpolation process, a color data other than primary color provided by the filter corresponding to each pixel is generated from row data of adjacent pixels. It is typical that the row data is generated by A/D conversion of the analog signal output from the CCD and written in a memory.

Hereinafter, discussion will be given for the conventional pixel interpolation process. The conventional pixel interpolation circuit performs interpolation between the pixels as shown in FIG. 13. As shown in FIG. 13, a color data of three primary color (R, G, B) of the pixel in question (hereinafter referred to as "target pixel") is obtained by arithmetic operation with reference to color information of the pixels located adjacent to the target pixel. For instance, taking the pixel labeled "B1" in FIG. 13 as the target pixel, the color data R0 and G0 other than B in the target pixel can be obtained through arithmetic operation in the following matter on the basis of row data of the pixels located adjacent to the target pixel. Namely, $$R0=(R1+R2+R3+R4)/4$$
$$G0=(G1+G2+G3+G4)/4$$
$$B0=B \text{ (as is)} \quad (1)$$

Conventionally, the foregoing pixel interpolation process has been performed.

When calculation of the foregoing equation (1) is performed, color data at nine positions are made reference to. In practice, reading out of row data from the memory has to be performed nine times. Therefore, number of the color data to be made reference to is large to lower process speed. On the other hand, since an adder circuit is required for summing four values, scale of the circuit becomes large.

A solid state image pick-up device disclosed in Japanese Unexamined Patent Publication No. Heisei 9-182090 concerns improvement in sensitivity but does not provide any solution for the problem in the prior art set forth above.

SUMMARY OF THE INVENTION

It is therefore an object of the present invention to provide a pixel interpolation method and a pixel interpolation circuit which can optimize processing in the pixel interpolation circuit and thus can permit down-sizing of a scale of the circuit and improvement of a process speed.

According to the first aspect of the present invention, a pixel interpolation method taking a pixel at a center of three row×three column image data as a target pixel subjecting interpolation process, calculating color data of the target pixel and color data of pixels around the target pixel and adjacent thereto for outputting an interpolated color data for the target pixel, comprises:

a reading step of reading out image data of sequential first to third rows among image data of N rows×M columns written in a memory, per each column, wherein N and M are integer at least equal to three; and a color data determining step of determining the interpolated color data for the target pixel on the basis of a first color data as one of color data for three pixels of the column read out immediately before color data of the target pixel, second and third color data for two other pixels simultaneously read out with the target pixel, and a fourth color data as one of color data for three pixels of the column read out immediately after color data of the target pixel data.

Then, the color data determining step may take data of the target pixel as the first color data, an average value of the first color data and the fourth color data as the third color data, and an average value of the second color data and the third color data as the second color data when the target pixel is the first color data among three primary colors.

On the other hand, the color data determining step may take data of the target pixel as the second color data, an average value of the first color data and the fourth color data as the first color data, and an average value of the second color data and the third color data as the third color data when the target pixel is the second color data among three primary colors.

Also, the color data determining step may take data of the target pixel as the third color data, an average value of the first color data and the fourth color data as the first color data, and an average value of the second color data and the third color data as the second color data when the target pixel is the third color data among three primary colors.

According to the second aspect of the present invention, a pixel interpolation circuit taking a pixel at a center of three row×three column image data as a target pixel subjecting interpolation process, calculating color data of the target pixel and color data of pixels around the target pixel and adjacent thereto for outputting an interpolated color data for the target pixel, comprises:

reading means for reading out image data of sequential first to third rows among image data of N rows×M columns written in a memory, per each column, wherein N and M are integer at least equal to three; and color data determining means for determining the interpolated color data for the target pixel on the basis of a first color data as one of color data for three pixels of the column read out immediately before color data of the target pixel, second and third color data for two other pixels simultaneously read out with the target pixel, and a fourth color data as one of color data for three pixels of the column read out immediately after color data of the target pixel data.

The color data determining means may include means for deriving an average value of the first color data and the fourth color data and means for deriving an average value of the second color data and the third color data, and take data of the target pixel as the first color data, an average value of the first color data and the fourth color data as the third color data, and an average value of the second color data and the third color data as the second color data when the target pixel is the first color data among three primary colors.

On the other hand, the color data determining means may include means for deriving an average value of the first color data and the fourth color data and means for deriving an average value of the second color data and the third color data, and take data of the target pixel as the second color data, an average value of the first color data and the fourth color data as the first color data, and an average value of the second color data and the third color data as the third color data when the target pixel is the second color data among three primary colors.

Also, the color data determining means may include means for deriving an average value of the first color data and the fourth color data and means for deriving an average value of the second color data and the third color data, and take data of the target pixel as the third color data, an average value of the first color data and the fourth color data as the first color data, and an average value of the second color data and the third color data as the second color data when the target pixel is the third color data among three primary colors.

In short, according to the present invention, among pixels located around and adjacent to a target pixel at the center of a three row×three column image data, number of pixels made reference to becomes smaller than that in the prior art. Then, by improving construction of the memory, down-sizing of the circuit scale and speeding up of reading out of data can be achieved.

Namely, in a pixel signal generating circuit of a CCD with a primary color filter, down-sizing of the circuit scale and speeding up of reading out of data can be achieved by optimization of the pixel interpolation circuit. Also, since the memory is provided a construction, in which a digital data derived through A/D conversion of an analog signal output from the CCD can be read out in parallel, process speed can be improved.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 2A is an illustration showing pixels to be made reference to in the case where a target pixel is R on RG line;

FIG. 2B is an illustration showing pixels to be made reference to in the case where a target pixel is G on RG line;

FIG. 2C is an illustration showing pixels to be made reference to in the case where a target pixel is G on GB line;

FIG. 2D is an illustration showing pixels to be made reference to in the case where a target pixel is B on GB line;

FIG. 11 is an illustration showing a relationship of connection between registers by a selector;

FIG. 12 is an illustration showing a reading and a writing timing for the memory.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1A:
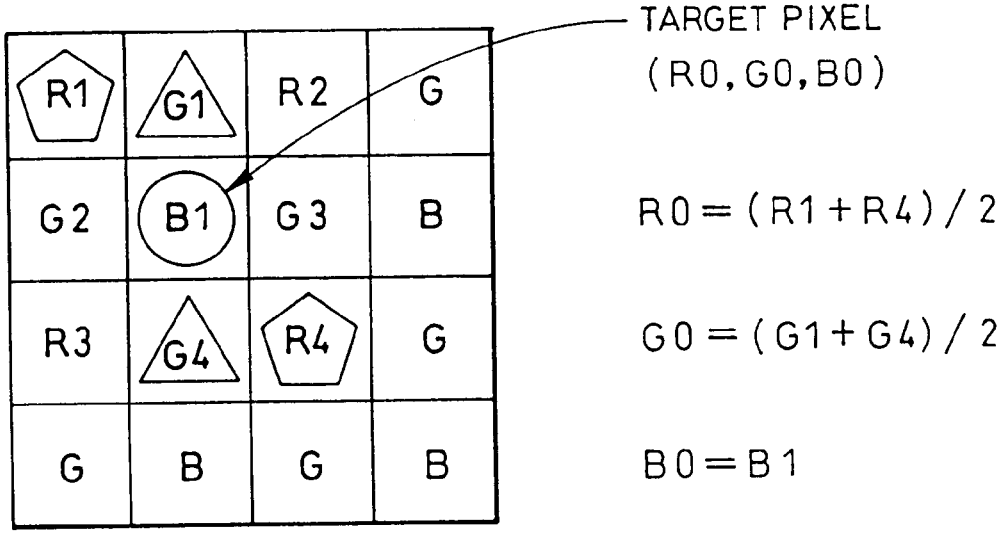
FIGS. 1A and 1B are illustrations showing one embodiment of a pixel interpolation method according to the resent invention.
Figure 1B:
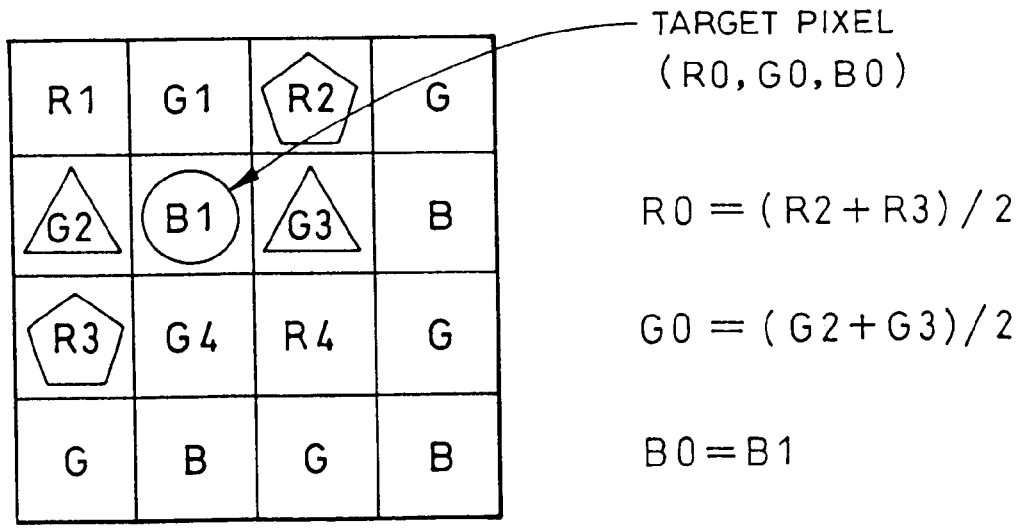
Figure 13:
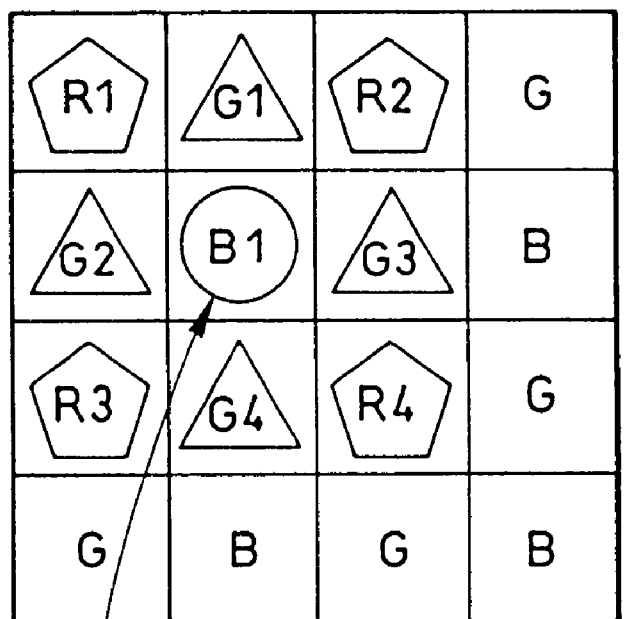
FIG. 13 is an illustration showing the conventional pixel interpolation method.

FIGS. 1A and 1B are illustrations showing one embodiment of the pixel interpolation method according to the present invention. It should be noted that like elements in FIGS. 1A and 1B to those in FIG. 13 will be identified by like reference signs.

In FIGS. 1A and 1B, there are illustrated a Bayer arranged as a filter array. Now, a pixel in question (hereinafter referred to as "target pixel") is assumed as "B1" data in a circle in FIGS. 1A and 1B. In case of the simplified method shown in FIG. 1A, R data as an interpolated color data "R0" for red color in the position of the target pixel is expressed by R0=(R1+R4)/2, an interpolated color data "G0" for green color is expressed by G0=(G1+G4)/2. B data "B0" as an interpolated color data for blue color is B0=B1. In FIGS. 1A and 1B, R data is shown by pentagon and G data is shown by triangle for the purpose of illustration and identification of colors.

In the method shown in FIG. 1A, row data of the pixels locate d adjacent to the target pixel in vertical direction are used. Therefore, color resolution in vertical direction is lowered. Accordingly, when higher vertical resolution is required, a process shown in FIG. 1B may be performed. In this case, respective interpolated color data of R, G and B are expressed by R0=(R2+R3)/2, G0=(G2+G3)/2, B0=B1, respectively.

By the method shown in FIGS. 1A and 1B, reading out of row data from the memory is simplified to five positions. Therefore, in comparison with the conventional pixel interpolation, in which row data for nine positions are read out, a process speed can be improved. Associating with thus, it is only required an adder circuit summing two values to permit down-sizing of the overall circuit.

In short, the pixel interpolation method shown in FIGS. 1A and 1B is a method, in which a pixel at the center of an image data of three rows×three columns is taken as the target pixel. The color data for the pixel and the color data of the pixels around the target pixel adjacent thereto are calculated to output the interpolated color data of the target pixel data. Then, among the pixel data of N rows×M columns written in the memory, concerning sequence of first to third rows of pixel data, reading out of the image data is performed per each column. The interpolated color data (R0, G0, B0) of the target pixel is determined on the basis of the first color data (R1 of FIG. 1A) as one of the color data for three pixels of the column read out immediately before the color data of the target pixel (B1 in FIG. 1A) and the second and third color data (G1 and G4 of FIG. 1A) of other two pixels read out simultaneously with the first color data, the fourth color data (R4 of FIG. 1A) as one of color data of three pixels read out immediately after color data of the target pixel.

Here, while the first color data R1 and the fourth color data R4 are in mutually different rows, color data in the same row (for example, R1 and R2 or R3 and R4) may be taken as the first and fourth color data. In short, in the method of the according to the present invention, since number of pixels to be made reference to has been reduced in comparison with that of the prior art, process speed can be improved.

On the other hand, in the Bayer arrangement, when R of an RG line consisted of R and G is the target pixel, data of the pixel is calculated on the basis of respective data of the positions of the circle (○) shown in FIG. 2A. When G of the RG line is the target pixel, the data of the pixel is calculated on the basis of respective data at the positions of circle shown in FIG. 2B.

On the other hand, in the Bayer arrangement, when G of an GB line consisted of G and B is the target pixel, data of the pixel is calculated on the basis of respective data of the positions of the circle shown in FIG. 2C. When B of the GB line is the target pixel, the data of the pixel is calculated on the basis of respective data at the positions of circle shown in FIG. 2D.

Figure 3:
FIG. 3 is an illustration showing the pixel interpolation method for improving a process speed in the pixel interpolation method of FIG. 1.

A pixel interpolation method further improving the process speed using the simplified method as set forth above, is illustrated in FIG. 3. Such alternation of the pixel interpolation method will be discussed with reference to FIG. 3.

The row data output from a not shown CCD is normally accumulated in a writable memory (which can be RAM (Random Access Memory: hereinafter RAM is used as representation of all of applicable writable memory). With taking RAM having a capacity of number of pixels in the horizontal direction of the CCD (=1 line) as one unit, RAM is formed with providing capacity for a plurality of lines so that the row data of different lines may be read out simultaneously. By this, process speed can be improved in comparison with the case where reading out of the row data of one line at one time.

Reading operation shown in FIG. 3 will be discussed hereinafter together with an example of order of reading out. At first, R00 of the line 0 will be read out. Next, G00 of the line 0, B10 of the line 1, G20 of the line 2 are read out. Finally, R21 of the line 2 is read out. By reading out in the sequential order, respective of R, G, B data can be obtained with respect to B10 as the target pixel by the following equation (2). Namely, $R(1)=(R00+R21)/2$ $G(1)=(G00+G20)/2$ $B(1)=B10$ (2)

Accordingly, in order to generate data for one pixel of the target pixel, reading out against the not shown RAM has to be performed for three times.

Figure 4:
FIG. 4 is an illustration showing the pixel interpolation method for improving process speed by improving reading process against a memory.

Furthermore, by alternately storing data for one line in two RAMs per two pixels without varying total storage capacity of RAM, as shown in FIG. 4, the necessary row data can be read out simultaneously even for the row data in the same line. With taking a construction which permits reading out of RAM in parallel, process speed can be improved. The operation of the case of FIG. 4 will be discussed in sequential order.

At first, R00 in the line 0 is read out. Next, G00 of the line 0, B10 of the line 1, G20 of the line 2 and R21 of the line 2 are read out simultaneously. At this time, G20 and R21 are on the same line but are accumulated in different RAMs. Thus, both are read out simultaneously. Data of R, G, B of the target pixel B10 at this time can be obtained by the following equation (3). Namely, $R(1)=(R00+R21)/2$ $G(1)=(G00+G20)/2$ $B(1)=B10$ (3)

Accordingly, in the case shown in FIG. 4, in order to generate data for one pixel of the target pixel, reading out against RAM has to be performed twice.

Figure 5:
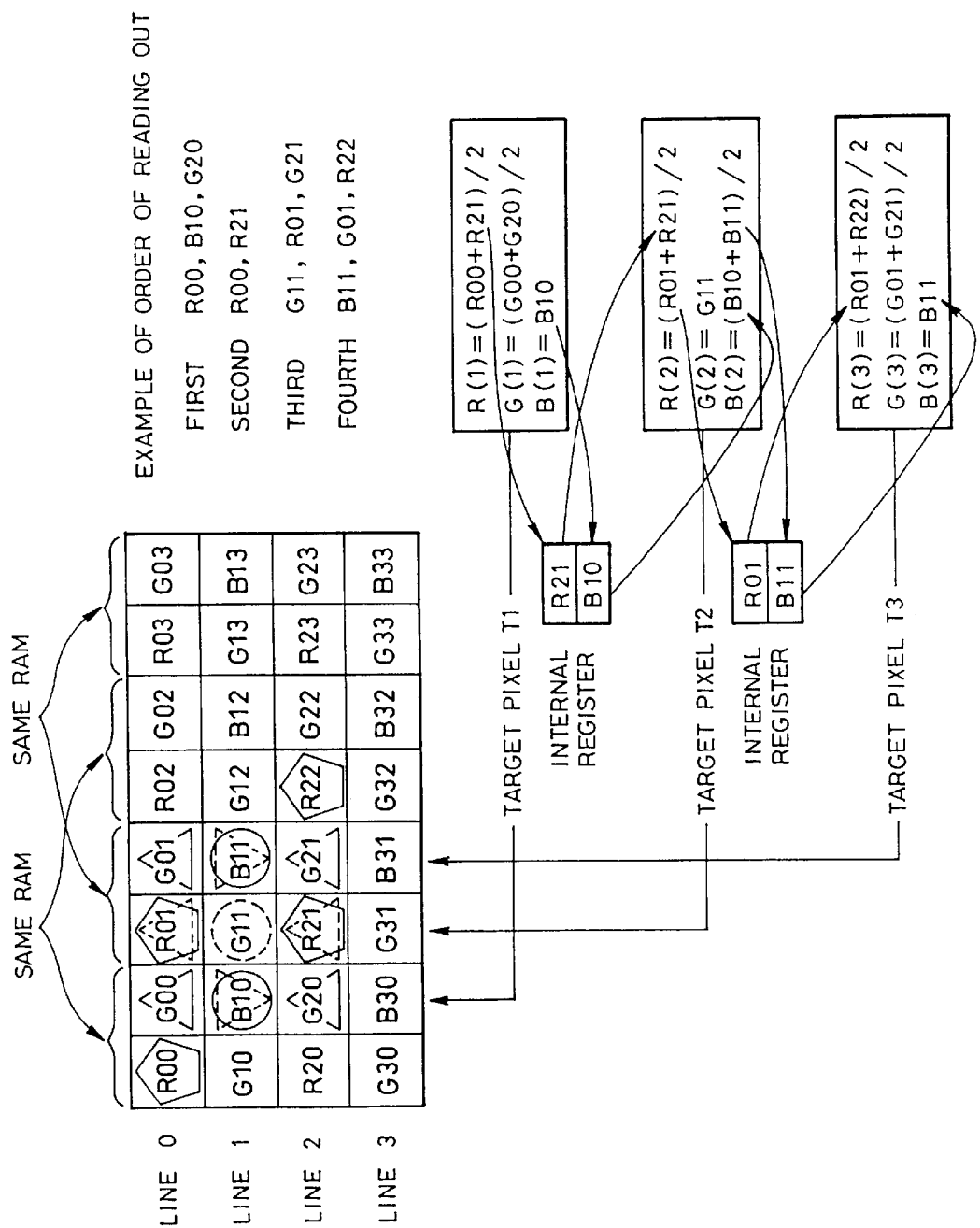
FIG. 5 is an illustration showing the pixel interpolation method for improving process speed again using the once read out data.

Furthermore, as shown in FIG. 5, previously read out row data can be used for calculation of the color data of the next target pixel. Therefore, by maintaining the read out row data with in a temporary register, number of times of reading out against RAM can be reduced. Accordingly, by this case, the process speed can be further improved. The operation in the case of FIG. 5 will be discussed hereinafter in sequential order.

At the first time, R00, B10 and G20 are read out. At the second time, G00 and R21 are read out. At this timing, concerning B10 as the target pixel T1, R, G, B data can be obtained by the following equation (4). Namely, $R(1)=(R00+R21)/2$ $G(1)=(G00+G20)/2$ $B(1)=B10$ (4)

Next, at the third time, G11, R01 and G21 are read out. Here, in order to generate the target pixel T2, row data of B10 and R21 are also required. In this case, B10 and R21 have already been read out upon generation of the target pixel T1. Therefore, by maintaining data of read out B10 and R21 in the register within the circuit, the maintained data are used.

Next, at the fourth time, B11, G01 and R22 are read out. At this time, data of R, G, B of G11 as the target pixel T2 can be obtained by the following equation (5). Namely, $R(2)=(R01+R21)/2$ $G(2)=G11$ $B(2)=(B10+B11)/2$ (5)

Furthermore, data of R, G, B of B11 as the target pixel T3 can be obtained by the following equation (6). Namely, $R(3)=(R01+R22)/2$ $G(3)=(G01+G21)/2$ $$B(3)=B11 \tag{6}$$

Row data of R01 and B11 necessary in the equation (6) have already been read out upon generation of the target pixel T2. Therefore, by maintaining the read out R01 and B11 in the register within the circuit, those maintained data are used.

In order to implement the foregoing reading method, a small number of internal registers (two internal registers in the shown embodiment) are required. Then, in order to generate data for three pixels, reading out of RAM is performed four times. Accordingly, reading out of 4/3 times per one pixel is performed.

On the other hand, by increasing a look-ahead data amount (data amount to be preliminarily read out) by increasing the internal register, the number of times of reading out can be still further reduced.

Figure 6:
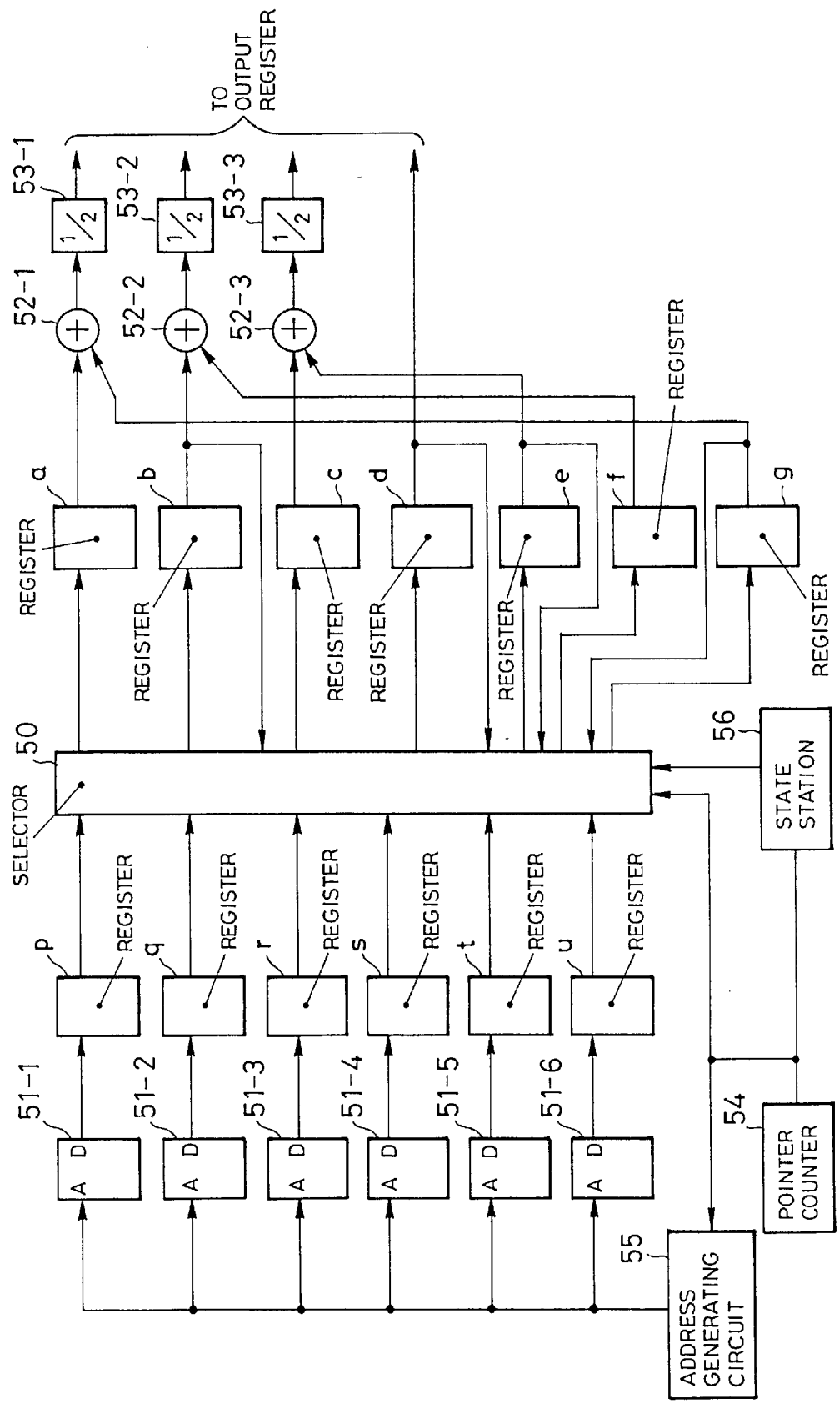
FIG. 6 is a block diagram showing a construction of one embodiment of the pixel interpolation circuit according to the present invention.

The pixel interpolation circuit for implementing the foregoing pixel interpolation process will be discussed with reference to FIG. 6. The pixel interpolating circuit in FIG. 6 is constructed with RAMs 51-1 to 51-6 storing row data and reading out data in response to address input, registers p, q, r, s, t and u provided corresponding to respective RAMs and temporarily storing data read out from RAMs, registers a, b, c, d, e, f and g inputting the outputs of the registers q, r, s, t and u though a selector 50 and temporarily storing the same, adders 52-1 to 52-3, a divider circuit 53-1 to 53-3 provided corresponding to the adders 52-1 to 52-3 and dividing the outputs of corresponding adders into one half.

The outputs of the divider circuits 53-1 to 53-3 and data maintained in the register d are input to corresponding output registers (not shown) respectively corresponding to R, G, B as output of the shown circuit. In this case, through the selector (not shown) controlled depending upon kind of the current target pixel, data is input to the output register.

On the other hand, the pixel interpolation circuit is constructed with a pointer counter 54 performing count of a pointer value, an address generation circuit 55 generating a read out address for respective RAM 51-1 to 51-6 depending upon the counter value, and a state station 56 managing kind of the pixel among four kinds shown in FIGS. 2A to 2D. It should be noted that the selector 50 is controlled by a value of the second least significant bit of the pointer counter 54 and the kind of the target pixel managed by the state station 56.

The operation of the pixel interpolation circuit will be discussed further with reference to FIGS. 7 to 10. In FIGS. 7 to 10, the process is initiated with taking initial values of H=0 and V=0. At first, after performing reading process against RAM (step S71), judgment is performed as to which of the RG line and the GB line, the target pixel presents (step S72).

When the target pixel is in the RG line, an RG line process is performed (step S73). On the other hand, when the target pixel is in the GB line, a GB line process is performed (step S74).

Then, incrementing the value of V, the process is advanced to the process in the next line (step S75). The foregoing process is repeated up to the final line (step S76→S71 . . . ).

Figure 7:
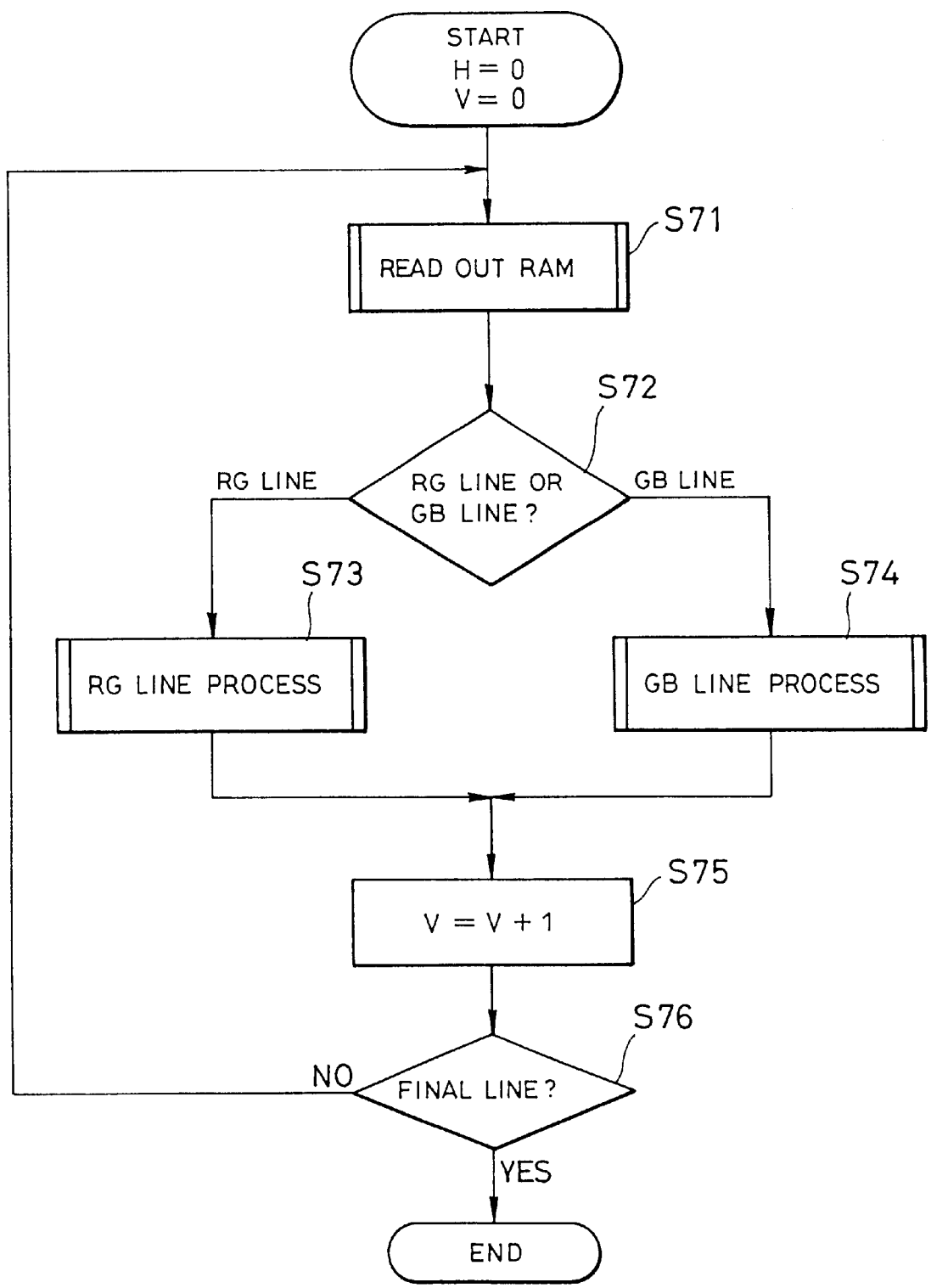
FIG. 7 is a flowchart showing an operation of the pixel interpolation circuit of FIG. 6.
Figure 8:
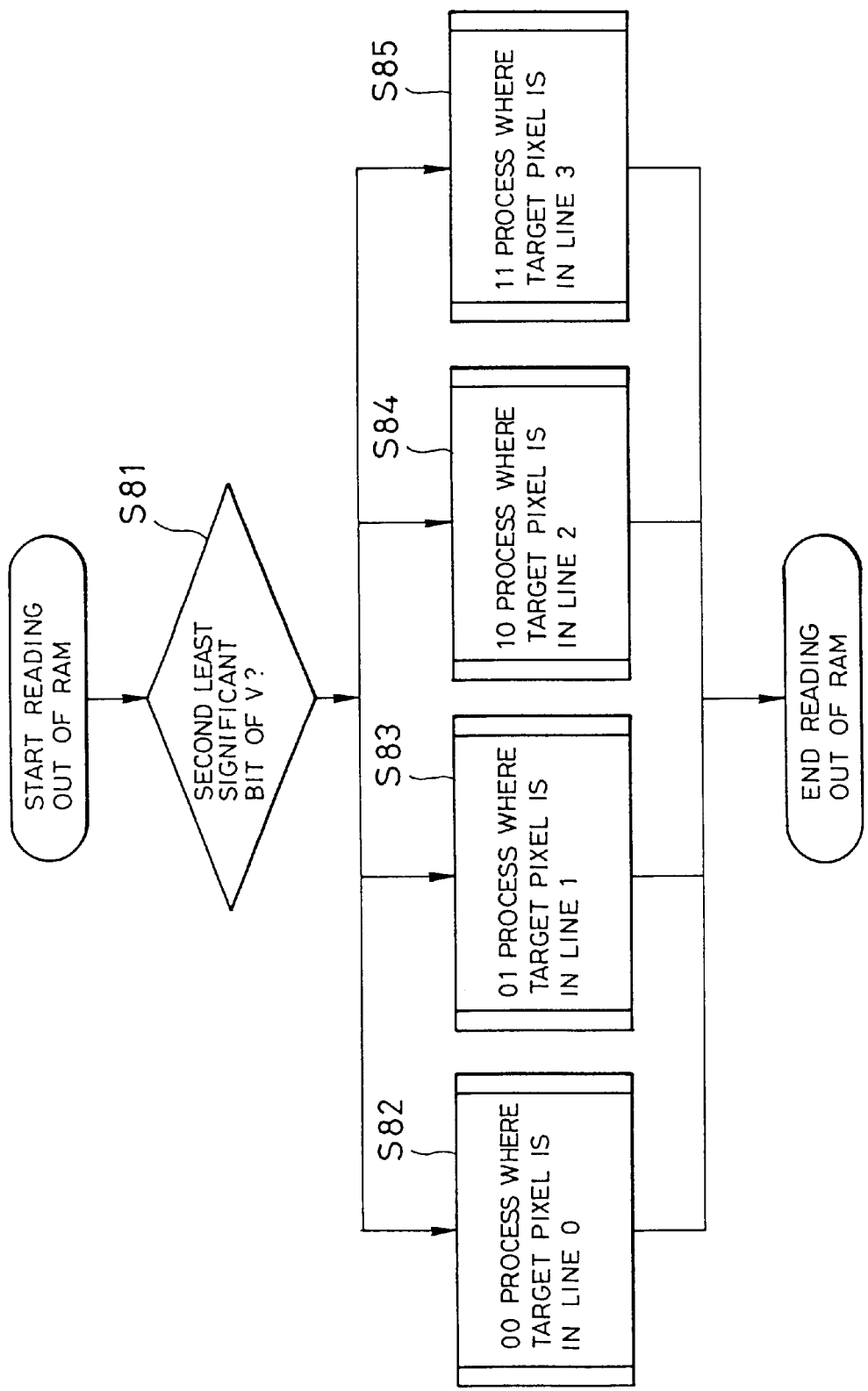
FIG. 8 is a flowchart showing reading operation against the memory in the circuit of FIG. 6.

Next, RAM read out process at step S71 in FIG. 7 will be discussed with reference to FIG. 8. In FIG. 8, the value of the second least significant bit of V is checked (step S81). When the value of the second least significant bit is 00, process of the line 0 of FIG. 12 which will be discussed later, will be performed(step S82). When the value of the second least significant bit is 01, the process of line 1 of FIG. 12 discussed later will be performed(step S83). When the value of the second least significant bit is 10, the process of line 2 of FIG. 12 discussed later will be performed(step S84). When the value of the second least significant bit is 11, the process of line 3 of FIG. 12 discussed later will be performed (step S85).

Figure 9:
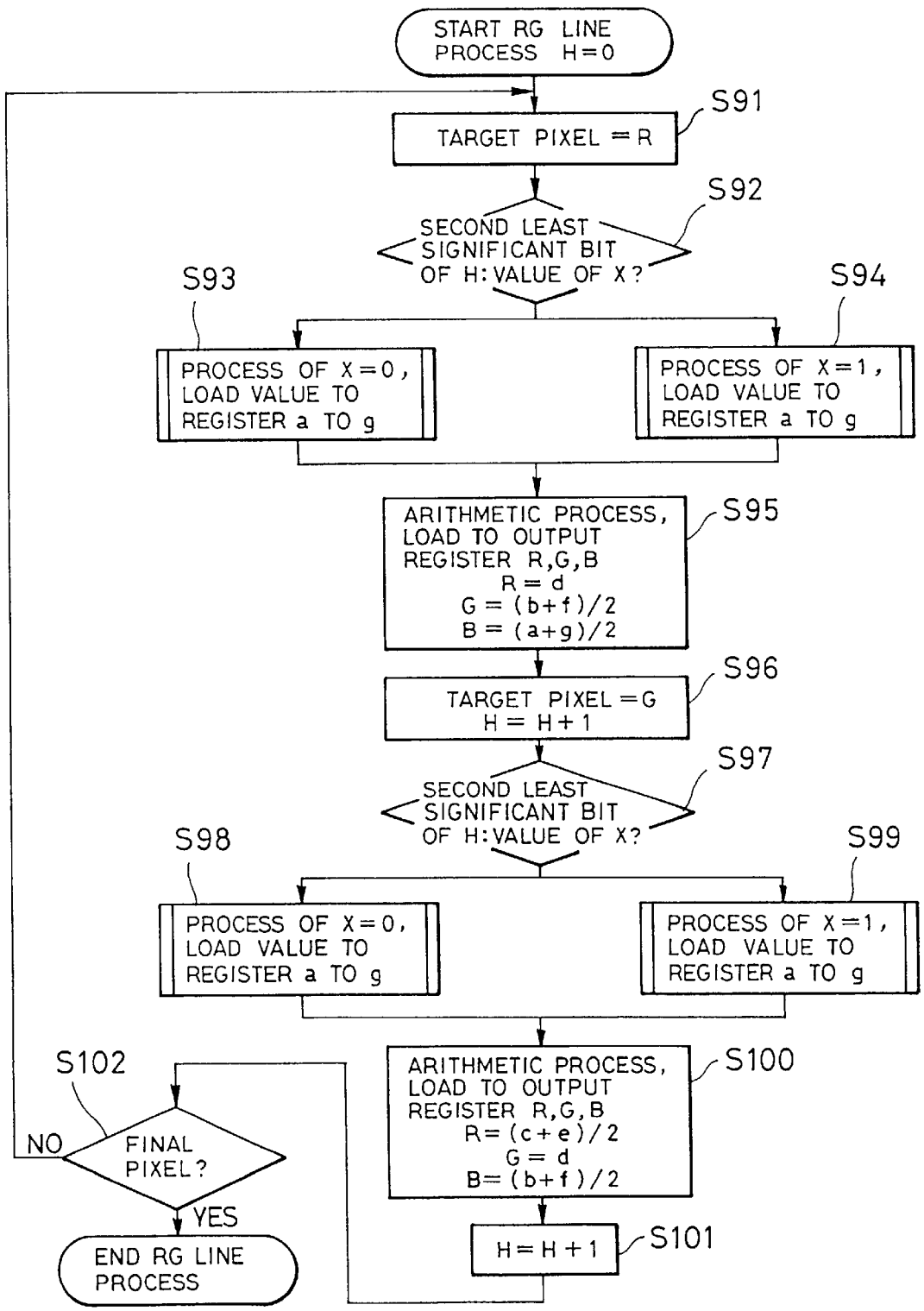
FIG. 9 is a flowchart showing a process for the RG line in the circuit of FIG. 6.

Next, the RG line process at step S73 in FIG. 7 will be discussed with reference to FIG. 9. In FIG. 9, a process is initiated with taking H=0 as the initial value. At first, when the target pixel is R (step S91), the value of the second least significant bit (x) of the value of H is checked (step S92). In respective case where the value is "0" and "1", as shown in FIG. 11 discussed later, a process to control the input/output relationship between the registers by the selector, is performed (steps S93 and S94). After the foregoing process, arithmetic operation and loading to the output registers R, G, B are performed (step S95). In this case, the value held in the register d (hereinafter occasionally referred to simply as "d") is taken as R, (b+f)/2 is taken as G and (a+g)/2 is taken as B.

On the other hand, in case that the target pixel is G, the value of H is incremented (step 96), and the value of the second least significant bit (x) of the value of H is checked (step S97). In respective case where the value is "0" and "1", as shown in FIG. 11 discussed later, a process to control the input/output relationship between the registers by the selector, is performed (steps S98 and S99). After the foregoing process, arithmetic operation and loading to the output registers R, G, B are performed (step S100). In this case, the value (c+e)/2 is taken as R, d is taken as G and (b+f)/2 is taken as B.

When the foregoing process is finished, the value of H is incremented (step S101). The foregoing process is repeated up to the final pixel (step S102→S91 . . . ).

Figure 10:
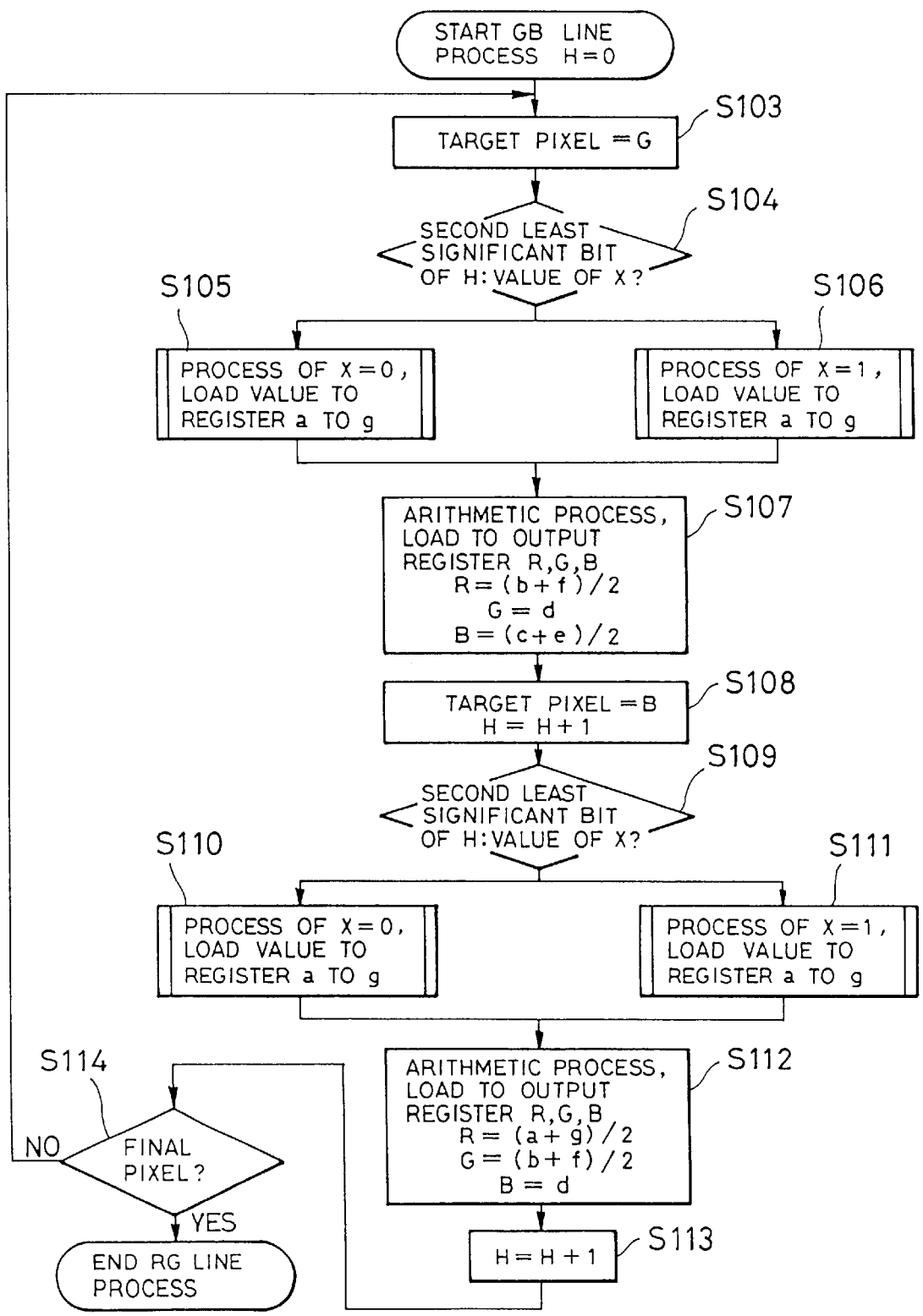
FIG. 10 is a flowchart showing a process for the GB line in the circuit of FIG. 6.

Next, the GB line process at step S74 in FIG. 7 will be discussed with reference to FIG. 10. In FIG. 10, a process is initiated with taking H=0 as the initial value. At first, when the target pixel is G (step S103), the value of the second least significant bit (x) of the value of H is checked (step S104). In respective case where the value is "0" and "1", as shown in FIG. 11 discussed later, a process to control the input/output relationship between the registers by the selector, is performed (steps S105 and S106). After the foregoing process, arithmetic operation and loading to the output registers R, G, B are performed (step S107). In this case, (b+f)/2 is taken as R, d is taken as G and (c+e)/2 is taken as B.

On the other hand, in case that the target pixel is B, the value of H is incremented (step S108), and the value of the second least significant bit (x) of the value of H is checked (step S109). In respective case where the value is "0" and "1", as shown in FIG. 11 discussed later, a process to control the input/output relationship between the registers by the selector, is performed (steps S110 and S111). After the foregoing process, arithmetic operation and loading to the output registers R, G, B are performed (step S112). In this case, the value (a+g)/2 is taken as R, (b+f)/2 is taken as G and d is taken as B.

When the foregoing process is finished, the value of H is incremented (step S113). The foregoing process is repeated up to the final pixel (step S114→S103 . . . ).

Here, discussion will be given for correspondence between the registers a to g on the output side of the selector and the registers storing the data to be input to respective registers a to g, with reference to FIG. 11.

In FIG. 11, when the target pixel is R in the RG line and the value x of the second least significant bit of the pointer counter is "0", the output of the register q is input to the register a when the target pixel is located at the left end, and otherwise, the output of the register b is input to the register a. To the register b, the output of the register p is input. When the target pixel is located at the left end, the output of the register r is input to the register d, and otherwise the output of the register e is input to the register d. To the registers f and g, the output of the register t is input.

When the target pixel is R in the RG line and the value x of the second least significant bit of the pointer counter is "1", the output of the register p is input to the register a when the target pixel is located at the left end, and otherwise, the output of the register b is input to the register a. To the register b, the output of the register q is input. When the target pixel is located at the left end, the output of the register s is input to the register d, and otherwise the output of the register e is input to the register d. To the registers f and g, the output of the register u is input.

On the other hand, when the target pixel is G in the RG line and the valuexof the second least significant bit of the pointer counter is "0", the output of the register p is input to the register b. To the register c, the output of the register r is input when the target pixel is located at the left end, and otherwise the output of the register d is input. To the register d, the output of the register r is input. To the register e, the output of the register s is input. To the register f, the output of the register t is input when the target pixel is located at the left end, and otherwise, the output of the register g is input.

When the target pixel is G in the RG line and the value x of the second least significant bit of the pointer counter is "1", the output of the register q is input to the register b. To the register c, the output of the register s is input when the target pixel is located at the left end, and otherwise the output of the register d is input. To the register d, the output of the register s is input. To the register e, the output of the register r is input. To the register f, the output of the register u is input when the target pixel is located at the left end, and otherwise, the output of the register g is input.

On the other hand, when the target pixel is G in the GB line and the valuexof the second least significant bit of the pointer counter is "0", the output of the register p is input to the register b. To the register c, the output of the register s is input when the target pixel is located at the left end, and otherwise the output of the register d is input. To the registers d and e, the output of the register r is input. To the register f, the output of the register t is input when the target pixel is located at the left end, and otherwise, the output of the register g is input.

When the target pixel is G in the GB line and the value x of the second least significant bit of the pointer counter is "1", the output of the register q is input to the register b. To the register c, the output of the register r is input when the target pixel is located at the left end, and otherwise the output of the register d is input. To the registers d and e, the output of the register s is input. To the register f, the output of the register u is input when the target pixel is located at the left end, and otherwise, the output of the register g is input.

On the other hand, when the target pixel is B in the GB line and the valuexof the second least significant bit of the pointer counter is "0", the output of the register p is input to the register a when the target pixel is located at the left end and otherwise, the output of the register b is input to the register a. To the register b, the output of the register p is input. To the register d, the output of the register r is input when the target pixel is located at the left end, and otherwise the output of the register e is input. To the register f, the output of the register t is input. To the register g, the output of the register u is input.

When the target pixel is B in the GB line and the value x of the second least significant bit of the pointer counter is "1", the output of the register q is input to the register a when the target pixel is located at the left end, and otherwise, the output of the register b is input to the register a. To the register b, the output of the register p is input. To the register d, the output of the register s is input when the target pixel is located at the left end, and otherwise, the output of the register e is input. To the register f, the output of the register u is input. To the register g, the output of the register t is input.

Namely, so as to establish input/output relationship shown in FIG. 11, the selector is controlled.

Next, referring to FIG. 12, when the second least significant bit of the foregoing V is "00", to the register p, the data read from RAM 7 is written. To the register q, data read out from RAM 8 is written. To the register r, data read from RAM 1 is written. To the register s, data read from RAM 2 is written. To the register t, data read from RAM 3 is written. To the register u, data read from RAM 4 is written. In this case, writing is performed for RAMs 5 and 6.

When the second least significant bit of the foregoing V is "01", to the register p, the data read from RAM 1 is written. To the register q, data read out from RAM 2 is written. To the register r, data read from RAM 3 is written. To the register s, data read from RAM 4 is written. To the register t, data read from RAM 5 is written. To the register u, data read from RAM 6 is written. In this case, writing is performed for RAMs 7 and 8.

Also, when the second least significant bit of the foregoing V is "10", to the register p, the data read from RAM 3 is written. To the register q, data read out from RAM 4 is written. To the register r, data read from RAM 5 is written. To the register s, data read from RAM 6 is written. To the register t, data read from RAM 7 is written. To the register u, data read from RAM 8 is written. In this case, writing is performed for RAMs 1 and 2.

Furthermore, when the second least significant bit of the foregoing V is "11", to the register p, the data read from RAM 5 is written. To the register q, data read out from RAM 6 is written. To the register r, data read from RAM 7 is written. To the register s, data read from RAM 8 is written. To the register t, data read from RAM 1 is written. To the register u, data read from RAM 2 is written. In this case, writing is performed for RAMs 3 and 4.

It should be noted that a printing medium recording programs for implementing the processes shown in FIG. 7 to FIG. 10 are preferred. By controlling respective portions of FIG. 6, pixel interpolation process similar to the above can be performed. As the printing medium, the semiconductor memory, the magnetic disk device and other various printing medium not shown in FIG. 6 can be used.

On the other hand, by controlling the computer by the program recorded in the storage medium, the pixel interpolation process similar to the above can be performed. As the printing medium, the semiconductor memory, the magnetic disk device and other various printing medium can be used.

As set forth above, in contrast to the conventional excessive pixel interpolation method, the present invention performs the optimized pixel interpolation method to achieve down-sizing of the scale of the circuit and improvement of the process speed. Furthermore, in the present invention, RAM accumulating row data necessary for pixel interpolation process is constructed in parallel construction and only small number of circuits are added for reading out operation of the row data, the process speed can be improved in comparison with the prior art.

As set forth above, the present invention reduces number of pixels to make reference to among the pixels around the target pixel at the center of the 3 row×3 column image data and adjacent thereto, down-sizing of the circuit scale, and speeding up of reading out of data can be realized. Also, by constructing the RAM, to which the A/D converted digital data of the analog signal output from the CCD, to read out in parallel, process speed can be improved.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A pixel interpolation method for interpolating a set of red, green, and blue color values for a single target pixel located at a center of a three row×three column image by calculating red, green and blue color values of said target pixel from color data of only four pixels around said target pixel and adjacent thereto for outputting interpolated color values for said target pixel, comprising:

a reading step of reading out red, blue, and green image data of sequential first to third rows from among image data of N rows×M columns written in a memory, per each column, wherein N and M are integers at least equal to three; and a color data determining step of determining the interpolated color values for said target pixel on the basis of only five pixel color data from a first read step of the column located immediately before the column containing the target pixel to obtain a first pixel color data, a second read step of the column wherein the target pixel is located to obtain, in a single read step, a pixel color data for the target pixel, and a second pixel color data and a third pixel color data from two pixels located adjacent the target pixel, and a third read step of the column located immediately after the column containing the target pixel to obtain a fourth pixel color data.

2. A pixel interpolation method as set forth in claim 1, wherein said color data determining step takes the color data of said target pixel as the red color value of the red, green, and blue color values set, an average value of said first pixel color data and said fourth pixel color data as the blue color value of the red, green, and blue color values set, and an average value of said second pixel color data and said third pixel color data as the green color value of the red, green, and blue color values set when said target pixel is a red pixel.

3. A pixel interpolation method as set forth in claim 1, wherein said color data determining step takes the color data of said target pixel as the green color value, an average value of said first pixel color data and said fourth pixel color data as the red color value, and an average value of said second pixel color data and said third pixel color data as the blue color value when said target pixel is a green pixel.

4. A pixel interpolation method as set forth in claim 1, wherein said color data determining step takes data of said target pixel as the blue color value, an average value of said first pixel color data and said fourth pixel color data as the red color value, and an average value of said second pixel color data and said third pixel color data as the green color value when said target pixel is a blue pixel.

5. A pixel interpolation method as set forth in claim 1, wherein said first pixel color data and said fourth pixel color data are taken from pixels in mutually different rows.

6. A pixel interpolation method as set forth in claim 1, wherein said first pixel color data and said fourth pixel color data are taken from pixels in the same row.

7. A pixel interpolation method as set forth in claim 1, wherein said memory is written a digital image data per each row sequentially output from a solid state image pick-up element, in sequential order.

8. A pixel interpolation method as set forth in claim 7, wherein said memory is consisted of a plurality of memory elements and said digital image data for one row is alternately written in different memory elements per every given number of pixels.

9. A pixel interpolation method as set forth in claim 1, which further comprises an image data writing step of writing an image data in the fourth row of said memory simultaneously with color data determining operation by said color data determining step.

10. A pixel interpolation circuit for taking a pixel at a center of three row×three column image data as a target pixel, calculating color data of said target pixel from color data of pixels around said target pixel and adjacent thereto, and for outputting an interpolated red, green, and blue color data set for said target pixel, comprising:

reading means for reading out image data of sequential first to third rows among image data of N rows×M columns written in a memory, per each column, wherein N and M are integers at least equal to three; and color data determining means for determining the interpolated red, green, and blue color data for said target pixel on the basis of first pixel color data taken from one of three pixels of the column read out immediately before the column containing said target pixel, target pixel color data, second pixel and third pixel color data taken from the two other pixels in the column containing the target pixel and simultaneously read out with said target pixel, and a fourth pixel color data taken from one of three pixels of the column read out immediately after the column containing said target pixel data.

11. A pixel interpolation circuit as set forth in claim 10, wherein said color data determining means includes means for deriving an average value of said first pixel color data and said fourth pixel color data and means for deriving an average value of said second pixel color data and said third pixel color data, and said color data determining means takes said target pixel color data as a first primary color data, an average value of said first pixel color data and said fourth pixel color data as a third primary color data, and an average value of said second pixel color data and said third pixel color data as a second primary color data when said target pixel is the first primary color data among three primary colors.

12. A pixel interpolation circuit as set forth in claim 10, wherein said color data determining means includes
  means for deriving an average value of said first pixel color data and said fourth pixel color data and
  means for deriving an average value of said second pixel color data and said third pixel color data, and
  said color data determining means takes
  said target pixel color data as a second primary color data,
  an average value of said first pixel color data and said fourth pixel color data as a first primary color data, and
  an average value of said second pixel color data and said third pixel color data as a third primary color data
  when said target pixel is the second primary color data among three primary colors.

13. A pixel interpolation circuit as set forth in claim 10, wherein said color data determining means includes
  means for deriving an average value of said first pixel color data and said fourth pixel color data and
  means for deriving an average value of said second pixel color data and s aid third pixel color data, and
  said color data determining means takes said target pixel color data as a third primary color data,
  an average value of said first pixel color data and said fourth pixel color data as a first primary color data, and
  an average value of said second pixel color data and said third pixel color data as a second primary color data when said target pixel is the third primary color data among three primary colors.

14. A pixel interpolation circuit as set forth in claim 11, wherein said first primary color data is a red color data, said second primary color data is a green color data and said third primary color data is a blue color data.

15. A pixel interpolation circuit as set forth in claim 10, wherein said first color data and said fourth color data are taken from pixels in mutually different rows.

16. A pixel interpolation circuit as set forth in claim 10, wherein said first color data and said fourth color data are taken from pixels located in the same row.

17. A pixel interpolation circuit as set forth in claim 10, wherein said memory is written a digital image data per each row sequentially output from a solid state image pick-up element, in sequential order.

18. A pixel interpolation circuit as set forth in claim 17, wherein said memory is consisted of a plurality of memory elements and said digital image data for one row is alternately written in different memory elements per every given number of pixels.

19. A pixel interpolation circuit as set forth in claim 10, which further comprises image data writing means for writing an image data in the fourth row of said memory simultaneously with color data determining operation.

* * * * *